(No Model.) T. A. JEBB.
PROCESS OF AND APPARATUS FOR THE MANUFACTURE OF SACCHARINE COMPOUNDS.
No. 264,035. Patented Sept. 5, 1882.
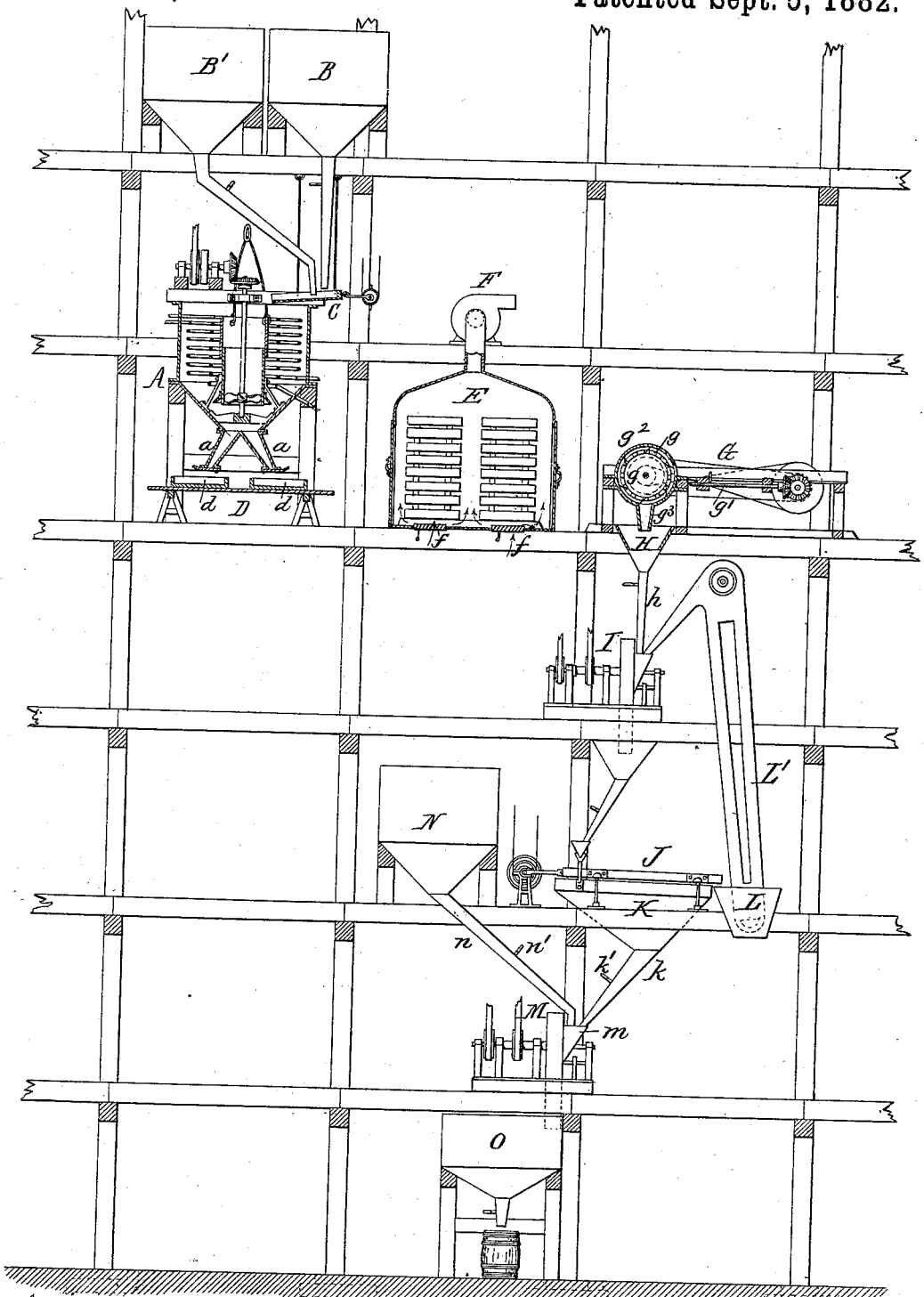

UNITED STATES PATENT OFFICE.

THOMAS A. JEBB, OF BUFFALO, NEW YORK.

PROCESS OF AND APPARATUS FOR THE MANUFACTURE OF SACCHARINE COMPOUNDS.

SPECIFICATION forming part of Letters Patent No. 264,035, dated September 5, 1882.

Application filed July 12, 1882. (No model.)

*To all whom it may concern:*

Be it known that I, THOMAS A. JEBB, of the city of Buffalo, in the county of Erie and State of New York, have invented new and useful Improvements in Process of and Apparatus for the Manufacture of Saccharine Compounds, of which the following is a specification.

This invention relates to the manufacture of compounds containing grape-sugar and cane-sugar or beet-sugar, and has for its object to produce a dry and hard grape-sugar compound in which cane or beet sugar is incorporated with grape-sugar, whereby the sticky or adhesive property of the grape-sugar is largely neutralized and the grains or crystals of cane or beet sugar are cemented together by the solidified grape-sugar.

My invention consists of the methods and apparatus which will be hereinafter fully described, and pointed out in the claims.

The accompanying drawing represents a sectional elevation of an apparatus which may be employed in carrying out my invention.

A represents a mixing apparatus, which is charged with liquid grape-sugar of the proper density to cause its solidification when left undisturbed, and in which the liquid grape-sugar is agitated and mixed with cane-sugar or beet-sugar. If the liquid grape-sugar is not sufficiently cool, it is caused to circulate in the mixing-machine A in contact with a cooling-surface, whereby it is cooled off and prepared for solidification. This mixing apparatus is preferably composed of a tank having a conical bottom provided with one or more discharge-nozzles, which are controlled by suitable valves, and one or more coils of pipe, through which cold water is caused to circulate. An agitating-screw or other suitable agitator is arranged near the bottom of the tank, within a cylinder open at the top and bottom, so that the rotation of the agitating-screw causes the liquid grape-sugar contained in the tank to flow upward through the inner cylinder and outward over the upper end thereof, thence downward along the cooling-coils, and inward into the inner cylinder at its lower end, whereby the material contained in the tank is kept in circulation.

B represents a bin or receptacle containing cane-sugar or beet-sugar in a granulated, pulverized, or otherwise more or less finely-reduced condition. This bin is provided with a discharge-spout, through which a certain portion of its contents can be discharged into the mixing-vessel A. The cane-sugar or beet-sugar is preferably mixed with grape-sugar in equal quantities, or thereabout; but any other suitable proportion of the ingredients may be employed, according to the use for which the sugar is intended and the demands of the trade. Any of the well-known grades of cane or beet sugar—such as granulated, powdered, or brown sugar—may be used for this purpose. The cane or beet sugar is preferably introduced into the liquid grape-sugar by sprinkling the cane or beet sugar over the surface of the liquid grape-sugar by means of a shaking sieve, C, as represented in the drawing, or by any other suitable mechanism. The cane-sugar or beet-sugar and grape-sugar are thoroughly mixed in the vessel A by the operation of the stirring or circulating mechanism, whereby the cane or beet sugar and the grape-sugar are thoroughly incorporated each with the other. When the mixture has assumed the consistency of thick cream it is drawn from the mixing-vessel A, through the discharge-spout or spouts *a* thereof, into pans or molds *d*, which latter may be temporarily placed, when filled, upon tables or supports D. These molds are preferably made about twelve inches wide, four inches deep, and thirty-six inches long; but other suitable dimensions may be adopted, it being understood that the sugar will become hard and dry more quickly in small molds than in large molds. The filled molds are then placed in a chamber, E, in or through which air is caused to circulate by a suction-fan, F, or any other suitable device or mechanism, and whereby the sugar contained in the molds is rapidly deprived of its heat and moisture. Air may be admitted into the chamber E through openings or registers *f* at or near its bottom, or in any other suitable manner. When the sugar in the molds has become sufficiently hard and solid it is preferably taken out of the molds and placed in the chamber E in such manner that a free circulation of air is obtained between the slabs or bars of sugar, whereby the process of hardening and drying is rapidly completed. The compound so produced consists of a hard and dry mass in which the grains or crystals of cane or beet sugar are firmly cemented or united together by the solidified grape-sugar. If desired, the sugar may be delivered from the mixing apparatus A directly into barrels or packages, in which it becomes hard and solid, and in which it is placed upon the market.

The slabs, blocks, or bars of sugar may be sold without further treatment; or they may be ground in the following manner: The slabs are first taken to a cutting, scraping, or shaving machine, G, by which the slabs are comminuted or reduced to fine shavings. A machine very well adapted for this purpose consists of a revolving cutter-head provided with a suitable number of knives, $g$, against which the slabs of sugar are fed by an automatic feed-screw, $g'$. The cutter-head is surrounded by a tight casing, $g^2$, in which the comminuted material is collected, and from which it is discharged through a spout, $g^3$, into a receptacle, H. The comminuted material passes from the receptacle H through a spout, $h$, into a mill, I, which may either be a disintegrating or a grinding or crushing mill of any suitable or well-known construction, and whereby the grape-sugar is further reduced to the desired degree of fineness. The ground, crushed, or disintegrated sugar passes from the mill I to a separating-machine, J, which consists preferably of a flat vibrating sieve properly constructed to separate the coarse particles which have not been reduced to the proper degree of fineness from the fine particles, the latter falling through the meshes of the sieve into a receiving-hopper, K, below, while the coarse particles pass over the tail of the sieve into a receptacle, L. A revolving bolt or any other suitable separating machine may, however, be employed, if preferred. The coarse material collected in the receptacle L is returned by an elevator, L', or suitable machinery to the mill I, in which it is reground, or to a separate mill, in which it is reground and from which the reground material is delivered to the separator. The sugar may be sold in this comminuted condition; or it may be mixed with an additional quantity of granulated or pulverized cane or beet sugar in the following manner:

M represents a mixing-machine of any suitable construction. I prefer to employ for this purpose a disintegrating-machine consisting essentially of several circular rows of pins or beaters revolving in opposite directions in a suitable case, which is provided with a feed-opening near the center of the machine and with a discharge-opening at its circumference:

N represents a hopper or receptacle, which contains granulated or pulverized cane sugar or beet-sugar, and which is provided with a discharge-spout, $n$, controlled by a slide, $n'$, and leading to the feed-hopper $m$ of the disintegrating-machine. The hopper K, which receives the fine material passing through the meshes of the separating-machine J, is also provided with a discharge-spout, $k$, leading to the feed-hopper $m$ of the disintegrating-mill, and controlled by a slide, $k'$. The material contained respectively in the hoppers K and N is simultaneously discharged therefrom in two streams, which meet in the feed-hopper $m$ of the disintegrating-mill M, and pass together into the latter, in which both materials are thoroughly mixed, and from which the mixture is discharged in a continuous stream as a uniform product.

The material may be delivered directly into barrels or packages as it comes from the mixing-machine; or, if preferred, it may be delivered into a store hopper or bin, O, and drawn off into barrels or packages from such hopper or bin. The supply of material to the mixing-machine from the hoppers K and N is preferably so regulated that equal parts of both materials are at all times supplied to the mixing-machine. When so regulated the ultimate product contains one part of grape-sugar to every three parts of cane-sugar or beet-sugar. These proportions may of course be varied to suit the demands of the trade. Any other suitable and well-known mixing-machine may be employed in the place of the disintegrating-mill M, if preferred. The disintegrating-mill M is preferably rotated at a slow rate of speed, so as to operate merely as a mixing-machine, thereby avoiding the grinding or further reduction of the granulated or pulverized cane or beet sugar supplied to the disintegrator.

If the sugar is sufficiently hard and brittle, the scraping-machine is omitted and the sugar fed directly to the mill, and in that case the blocks or slabs of sugar are preferably coarsely broken or cut by a suitable crushing or cutting machine before feeding the same to the mill.

If desired, a quantity of dry pulverized or scraped grape-sugar may be mixed with the liquid grape-sugar in the mixing-vessel A. In this case a second bin, B', is provided, which contains the pulverized grape-sugar, and from which the dry grape-sugar is supplied to the mixing-vessel A, preferably in the proportion of one part of dry grape-sugar to ten parts of the liquid grape-sugar. The dry sugar is preferably delivered into the mixing-vessel by distributing it in a spray over the surface of the liquid grape-sugar by means of a shaking sieve or any other suitable distributing device. The incorporation of dry cane or beet sugar with the grape-sugar destroys the gummy or adhesive property of the grape-sugar and renders the compound hard and dry, it greatly reduces the time required for the solidification of the sugar, and it lessens the tendency of the grape-sugar to absorb moisture from the atmosphere and ferment or turn sour in warm weather, thereby permitting the manufacture of the product to be carried on with the same success in warm weather as in cold weather.

I am aware that heretofore it has been proposed to mix cane and grape sugar in the form of solutions or sirups and to obtain the compound by crystallization out of the solution; also, that it has been proposed to add cane or beet sugar to a watery solution of grape-sugar immediately after conversion of the starch or dextrine into grape-sugar and before neutralizing the liquid; also, that it is not new to coat the grains of granulated cane or beet sugar with non-solidifying glucose, and I do not claim these processes, as they are essentially different from my invention; but

I claim as my invention—

1. The herein-described method of manufacturing a hard and dry saccharine compound, which consists in adding cane or beet sugar in a more or less finely-divided condition to liquid grape-sugar having the proper density to become solid, then thoroughly mixing these ingredients, and then delivering the semi-liquid compound into suitable molds or receptacles, in which the entire mass so delivered becomes hard and solid, thereby forming a hard, dry, and solid compound in which the grains or crystals of cane-sugar are cemented together by the solidified grape-sugar, substantially as set forth.

2. The herein-described process of manufacturing saccharine compounds, which consists in mixing grape-sugar with cane-sugar or beet-sugar, then permitting the mixture to become solid, then grinding, scraping, or otherwise pulverizing said compound, and then mixing a further quantity of cane-sugar or beet-sugar with the ground, scraped, or pulverized sugar, substantially as set forth.

3. The herein-described process of manufacturing saccharine compounds, which consists in mixing dry grape-sugar, scraped, ground, powdered, or otherwise reduced, and cane-sugar or beet-sugar, with liquid grape-sugar, substantially as set forth.

4. The herein-described process of manufacturing a hard and dry saccharine compound, consisting in adding dry cane or beet sugar in a more or less finely-divided condition to liquid grape-sugar of the proper density to become solid, then thoroughly mixing the ingredients, then delivering the semi-liquid mixture into suitable molds or pans, and then subjecting the sugar to an artificial air-current, whereby the sugar is dried and cooled, substantially as set forth.

5. In an apparatus for manufacturing saccharine compounds, the combination of a mixing-vessel, A, in which the liquid grape-sugar is prepared for its solidification, a receptacle containing dry pulverized sugar and provided with means whereby said sugar can be introduced into the mixing-vessel A, molds $d$, in which the sugar is permitted to become hard, a reducing-machine, whereby the solid grape-sugar is reduced to the proper degree of fineness, a receptacle, N, containing cane or beet sugar, and a mixing-machine, M, whereby the cane or beet sugar and the comminuted grape-sugar are intimately mixed, substantially as set forth.

T. A. JEBB.

Witnesses:
JNO. J. BONNER,
CHAS. F. GEYER.